May 1, 1923.

L. D. SOUBIER 1,453,290

METHOD OF AND MEANS FOR FEEDING MOLTEN GLASS

Filed June 1, 1920

INVENTOR
L. D. Soubier
By J. F. Rule.
His attorney.

May 1, 1923.

L. D. SOUBIER 1,453,290

METHOD OF AND MEANS FOR FEEDING MOLTEN GLASS

Filed June 1, 1920 5 Sheets-Sheet 2

INVENTOR
L. D. Soubier
By J. F. Rule
His attorney.

May 1, 1923.
L. D. SOUBIER
1,453,290
METHOD OF AND MEANS FOR FEEDING MOLTEN GLASS
Filed June 1, 1920　　　5 Sheets-Sheet 3
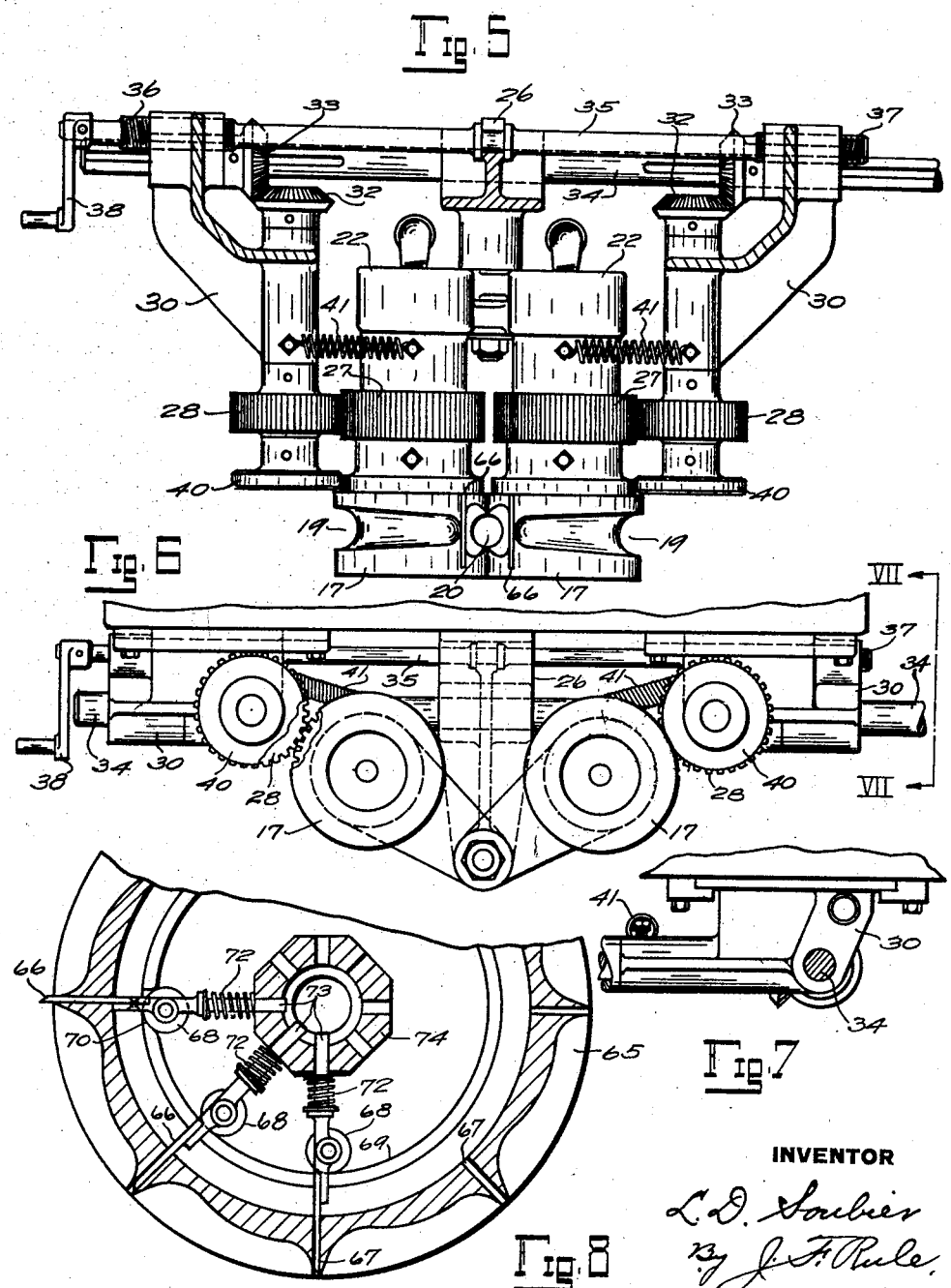
INVENTOR
L. D. Soubier
By J. F. Rule,
his attorney.

May 1, 1923.
L. D. SOUBIER
1,453,290
METHOD OF AND MEANS FOR FEEDING MOLTEN GLASS
Filed June 1, 1920  5 Sheets-Sheet 4
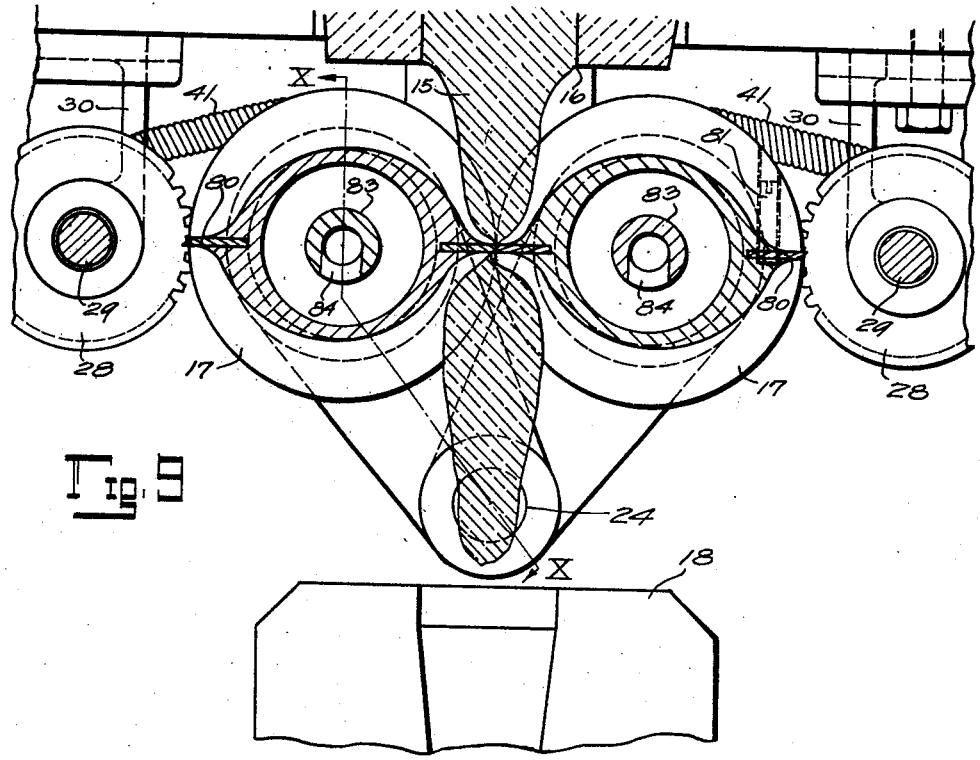
Fig. 9
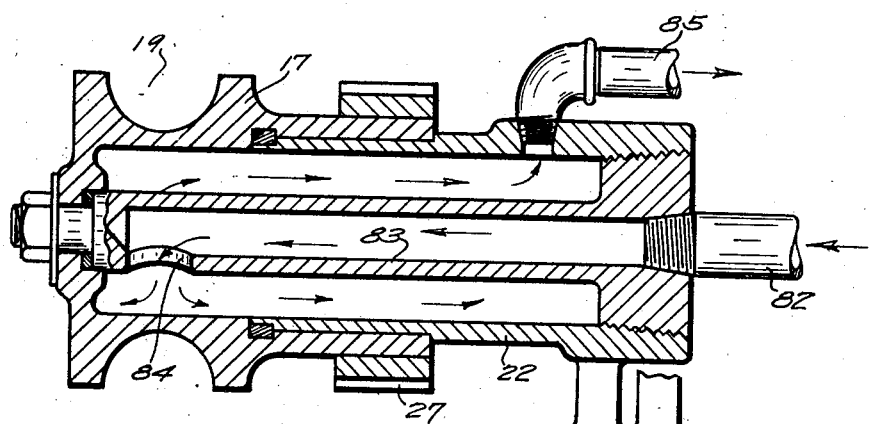
Fig. 10
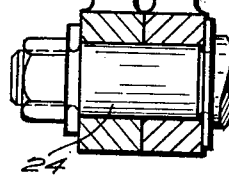
INVENTOR
L. D. Soubier,
By J. F. Rule
his attorney.

May 1, 1923.
L. D. SOUBIER
1,453,290
METHOD OF AND MEANS FOR FEEDING MOLTEN GLASS
Filed June 1, 1920   5 Sheets-Sheet 5
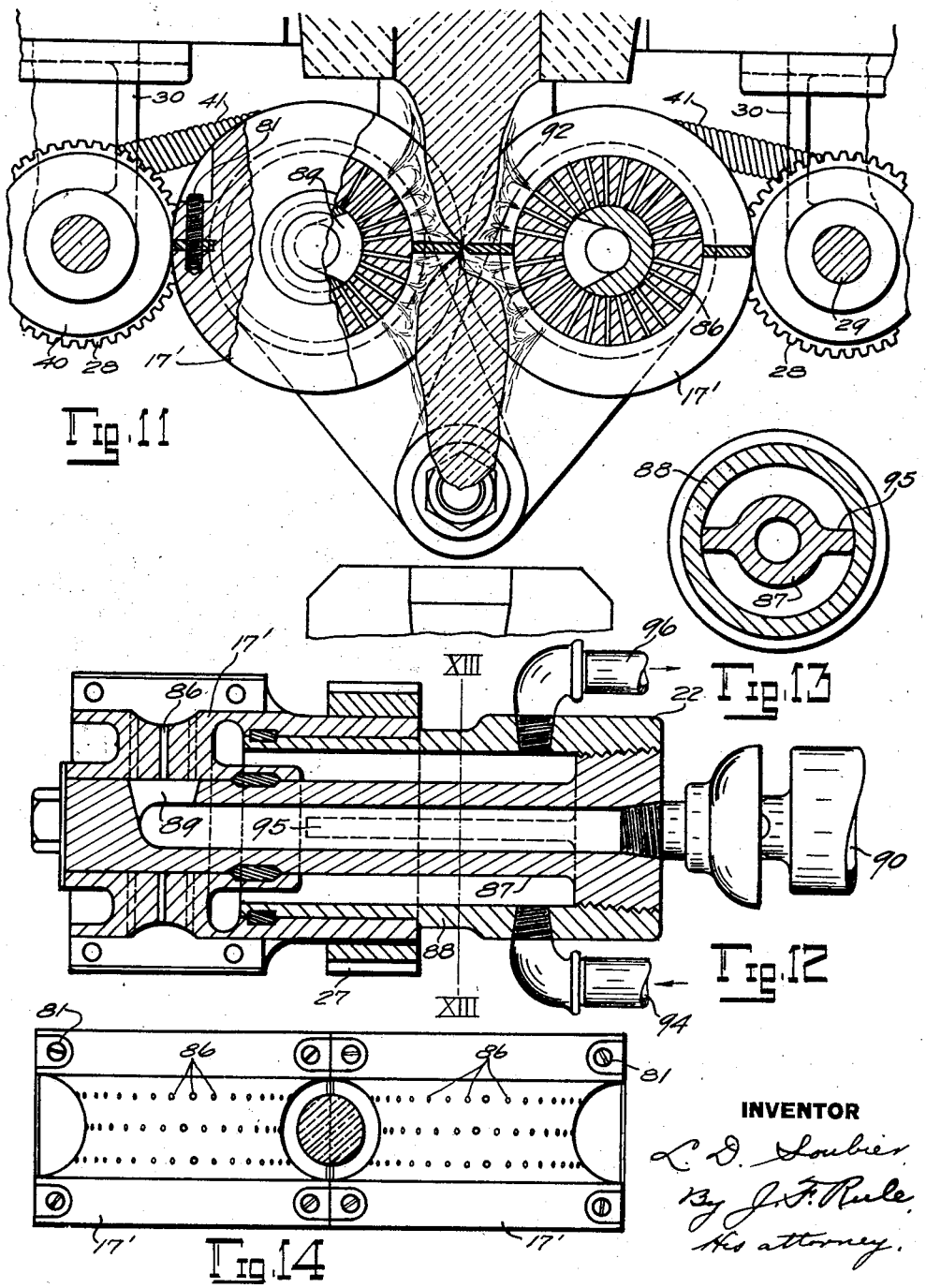

Patented May 1, 1923.

1,453,290

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

METHOD OF AND MEANS FOR FEEDING MOLTEN GLASS.

Application filed June 1, 1920. Serial No. 385,590.

*To all whom it may concern:*

Be it known that I, LEONARD D. SOUBIER, a citizen of the United States, residing at Toledo, in the county of Lucas and State of Ohio, have invented new and useful Improvements in Methods of and Means for Feeding Molten Glass, of which the following is a specification.

My invention relates to means for feeding molten glass from a container and forming it into gobs or mold charges of suitable size and shape for entering the molds of a glass forming machine. It is at present customary in the art to flow molten glass in the form of a stream from an outlet opening in a refining tank or other container and periodically sever the flowing glass to form individual masses or gobs which are introduced into the molds.

An object of the present invention is to provide suitable forming means to engage the descending column or stream of glass and shape it into gobs of suitable conformation and then sever them from the oncoming glass, such operation taking place without interrupting the continuous and substantially uniform flow of the glass.

In its preferred form, the invention comprises a pair of gob forming rolls having their peripheries running in contact and shaped to provide a passageway between the contacting peripheral edges of the rolls. The rolls are arranged to embrace the descending column of glass which is formed in said passageway into suitably shaped gobs, the latter being automatically severed by cutters carried on the rolls.

Other features and advantages of the invention will appear hereinafter.

In the accompanying drawings:

Figure 5 is a plan view of the apparatus.

Figure 6 is an elevation of the same, but with the rolls separated.

Figure 7 is a sectional view taken at the section line VII—VII on Figure 6.

Figure 8 is a sectional view of a modified form of gob forming roll.

Figure 9 is a sectional elevation of a modified construction, in which the cutters maintain a fixed relation to the forming rolls.

Figure 10 is a section taken at the line X—X on Figure 9.

Figure 11 is a view similar to Figure 9, but showing a further modification in which provision is made for reheating the glass during its formation into gobs.

Figure 12 is a sectional view of one of the rolls of Figure 11, and associated mechanism.

Figure 13 is a section at the line XIII—XIII on Figure 12.

Figure 14 is a plan view of the forming rolls shown in Figure 11, and also shows the glass in section.

Figure 1:
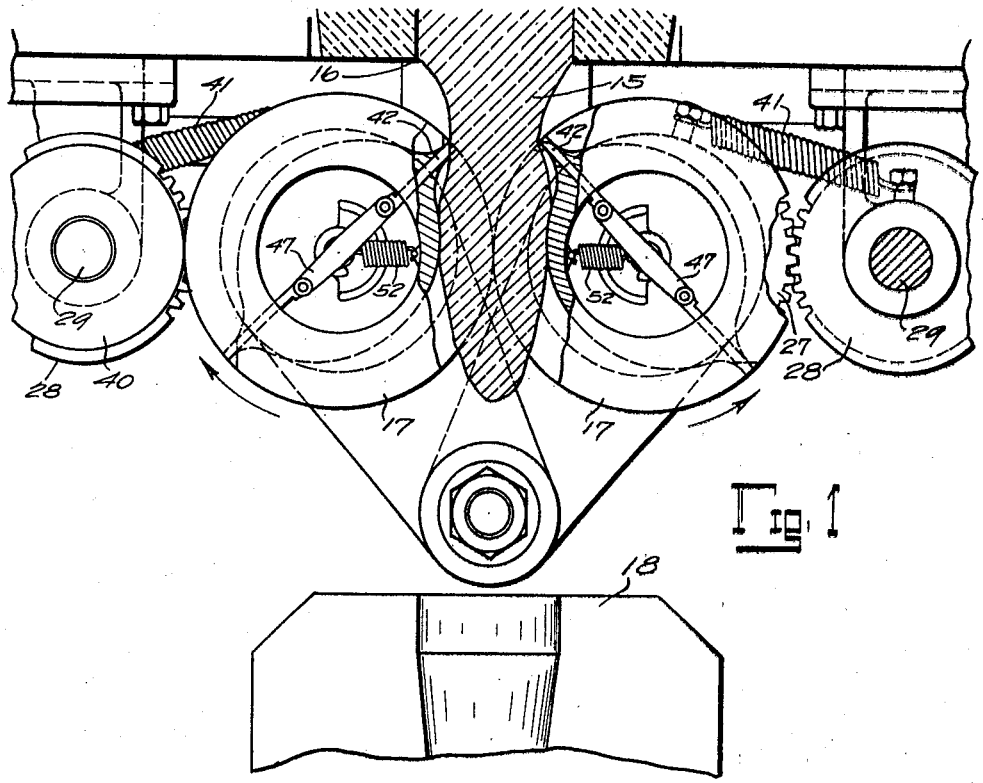
Figure 1 is a part sectional elevation of gob forming mechanism embodying the principles of my invention.
Figure 2:
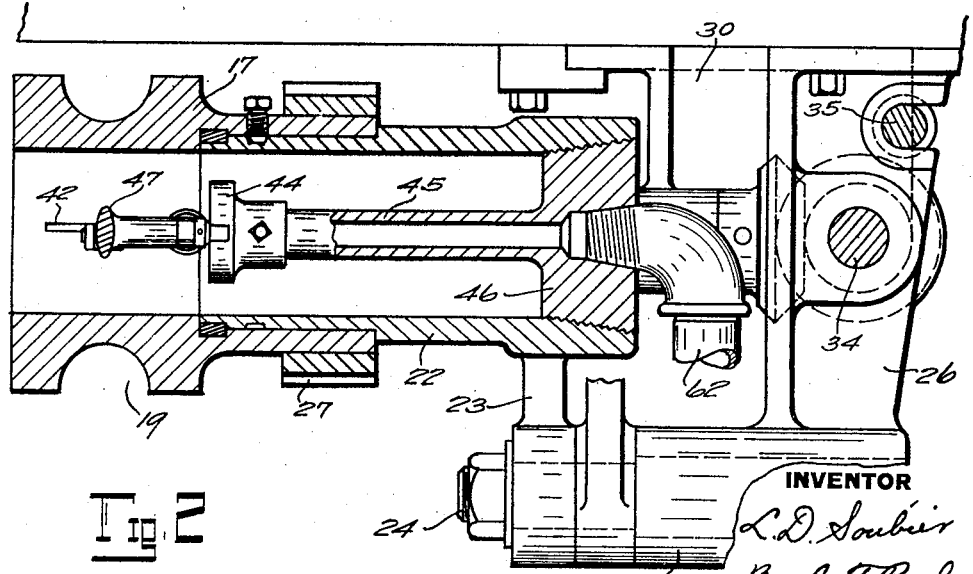
Figure 2 is a transverse sectional elevation through one of the rolls and its supporting member.

Referring particularly to Figures 1 to 7 inclusive, molten glass 15 flows from a container (which may be a boot or extension on the glass melting or refining furnace) through an outlet opening 16 in the bottom of said container. The glass as it leaves the container is formed into individual masses or gobs by means of a pair of rotary forming devices 17 by which the charges or gobs are given a suitable shape for entering the molds 18 of a glass forming machine. The forming devices 17 as here shown consist of a pair of rolls rotated continuously in the direction indicated by the arrows, with their peripheries in contact. Each roll is formed with two grooves or recesses 19 in its periphery, each of said grooves extending along approximately one-half the circumference of the roll. Said grooves may be semi-circular in cross-section, so that the two opposite grooves in the contacting peripheries of the rolls form a circular opening or passageway 20 (Fig. 5) surrounding the glass 15. The forward or leading ends of each pair of grooves 19 may be narrower and of smaller cross-sectional area than the opposite ends, so that the gobs of glass shaped thereby are tapered to conform approximately to the shape of the molds 18 into which they are dropped.

The forming rolls 17 are mounted on a pair of non-rotating cylindrical carriers or drums 22 having integral arms 23. Said arms are pivotally supported on a pivot rod 24 extending through a bearing sleeve 25 on a bracket 26 which may be bolted to the bottom of the furnace boot. Annular gears 27 secured to the rolls 17 are driven by gears 28 keyed to shafts 29 journalled in brackets 30. Mitre gears 32 on the shafts 29 run in mesh with gears 33 feathered on a drive shaft 34 extending transversely to the axes of the forming rolls. The shaft 34 has bearings in the brackets 30 and said brackets have a slidable mounting on the furnace boot or framework, as indicated in Figure 7, whereby the brackets together with the gearing thereon are movable horizontally toward and from each other. The forming rolls 17 may thus be separated, being movable from the Figure 5 position to the Figure 6 position. This arrangement is of value when for any reason it is desired to temporarily withdraw the forming molds from the flowing glass. The means for moving the rolls toward and from each other comprises a shaft 35 having a bearing in the central stationary bracket 26. Said shaft is provided with right and left hand screw threads 36 and 37 which work in threaded bearings in the brackets 30. The shaft 35 is rotated by a hand crank 38 to move the rolls toward and from each other. The shafts 29 may be provided with contact disks 40 having smooth peripheries which run on the rolls 17, the circumferences of the contacting surfaces of the rolls 17 and 40 being the same as the pitch circles for the gears 27 and 28. Springs 41 hold the rolls 40 and 17 together.

Means for cleanly severing the gobs comprise a pair of diametrically opposite cutters 42 mounted to reciprocate radially in each roll. Means are provided to project each cutter as it approaches cutting position and to withdraw the cutter after the gob has been severed. The means for actuating the cutters comprises a stationary cam 44 within each roll 17, said cam being mounted on a hollow stem 45 extending along the axis of the drum 22, said stem being formed on a plug 46 which forms a closure for the end of the drum 22. A connector 47 for the cutters is preferably in the form of a yoke connected at its ends to the cutters and is provided with a stem 48 to which is keyed an arm 49 carrying a cam roll 50 which runs on the cam 44. The roll 50 is held against the cam with a yielding pressure by means of a spring 52 connected at one end to a sleeve 53 rotatable on a pin 54 which connects the stem 48 and arm 49. The other end of the spring 52 is anchored to a lug 55 attached to the stationary drum 22.

Figure 3:
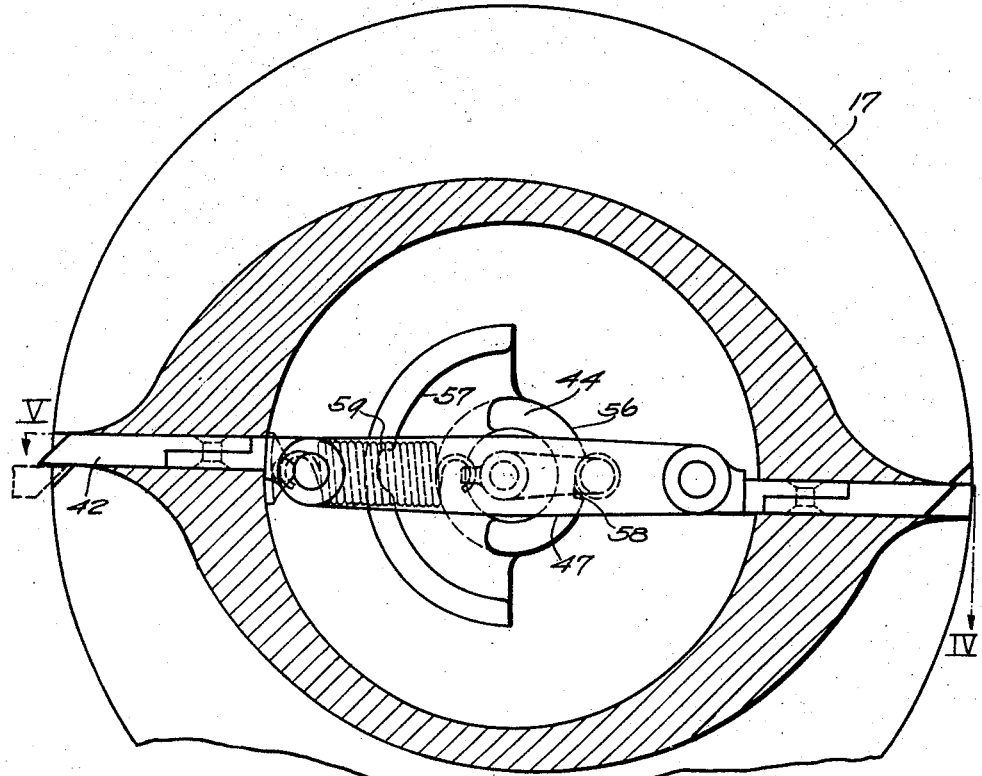
Figure 3 is a sectional view on a larger scale through one of the rolls, the section being taken at the line III—III on Figure 4.
Figure 4:
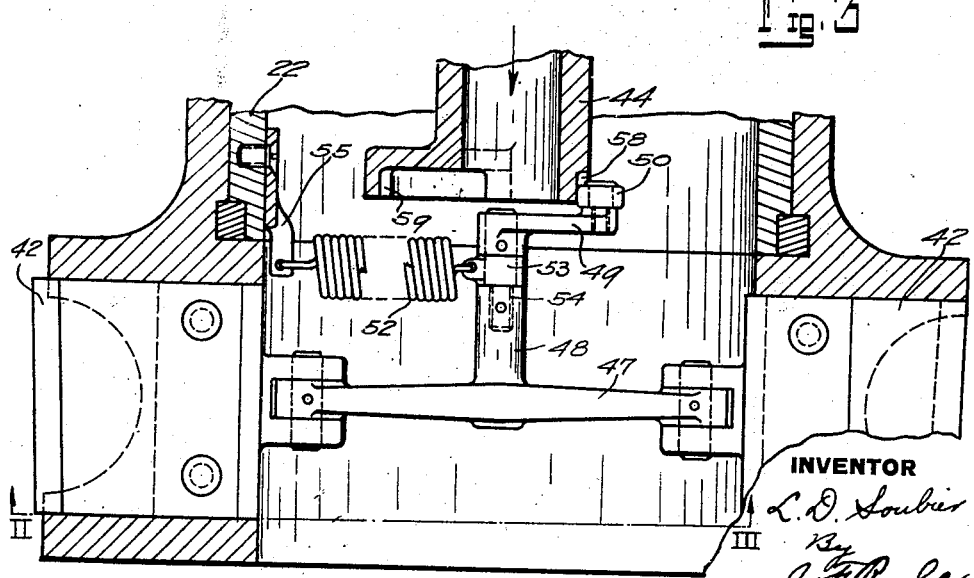
Figure 4 is a sectional plan, the section being taken at the line IV—IV on Figure 3.

It will be seen that with the construction just described the spring 52 is continually exerting an inward pull on the yoke 47, that is, in a direction to project the cutter 42 which is nearest the glass. The cam 44 is provided with an external cam surface 56 which extends through substantially 180 degrees, and an inner cam surface 57 extending the other half of the circumference. The surface 56 is formed with a notch or recess 58 so positioned that as a blade 42 reaches a substantially horizontal position the roll 50 will be snapped into the notch by the spring 52, thereby projecting the blade to cutting position, as indicated in Figures 3 and 4. The blade in the opposite roll 17 is simultaneously projected in the same manner, thereby completely severing a gob from the oncoming glass by a quick cutting action. As the roll 17 continues its rotation beyond the cutting position the cam roll 50 is lifted out of the notch 58 and runs on the surface 56, thereby holding the blade in its retracted position. As said blade passes beyond its lowermost or vertical position the cam roll engages the surface 57 and is held thereagainst by the spring 52. When the opposite blade reaches cutting position the cam roll drops into a notch 59, which functions in the same manner as the notch 58 for operating the cutter.

In order to prevent overheating of the forming rolls 17 and cutters, means may be provided for forcing air through the rolls, such means as shown comprising an inlet pipe 62 connected to the plug 46. The air entering said pipe is conveyed through the hollow stem 45 and thence through the roll 17. The yoke 47 and associated mechanism being in the path of the air, breaks up the air current and distributes it through the roll.

The drive shaft 34 through which motion is transmitted to the forming rolls 17 is connected through any suitable form of gearing to the machine carrying the molds 18, so that the formation of the gobs is in timed relation to the movements of the molds. That is to say, a gob is formed and severed each time the mold 18 is brought to charge receiving position. The gobs may drop directly into the molds or may be conveyed or directed to the molds by any suitable mechanism.

Figure 8 shows a modified form of roll provided with a multiplicity of gob forming cavities 65 in its periphery. A plurality of cutter blades 66 are provided, one for each cavity 65. These blades are mounted for radial movement in slots 67. A cam roll 68 carried by each blade runs on the inner surface of a stationary annular cam 69, the latter being provided with a recess 70 to permit the blade to be projected when it reaches cutting position. Each blade is projected by a coil spring 72 mounted on the stem 73 of the cutter, said stem being guided in the hub 74 of the roll. It will be understood that a pair of these cooperating rolls is provided, which rolls may be driven in the same manner as the rolls 17.

Figures 9 and 10 show a modification comprising cutters 80 which have a fixed mounting in the rolls. Each cutter may be seated in a slot in the roll and held by a set screw 81. Figures 9 and 10 also show a construction permitting a cooling liquid to be circulated through the rolls 17. The water or other cooling liquid enters through a pipe 82 and flows through a central hollow stem 83 and thence through an opening 84 near the outer end of said stem and circulates through the hollow drum and out through a pipe 85. The arrangement of the opening 84 in the bottom of the stem so that the water is discharged into the lower part of the drum, insures a proper circulation of the water within the drum.

Figures 11 to 14 illustrate a further modification wherein provision is made for heating the surface of the gob during its formation. In this arrangement the forming rolls 17' are provided with a multiplicity of radial openings or passageways 86 extending from the central opening of the roll to the gob forming surface. In this construction the hollow stem 87 of the supporting drum 88 has a close fit within the central bore of the forming roll 17'. The central bore of the stem 87 terminates in a radial passageway 89 with which the openings 86 are successively brought into register during the rotation of the forming molds. A combustible gas supplied through a pipe 90 flows through the stem 87, passageway 89 and ports 86. This gas as it emerges from said ports is burned, thereby enveloping the glass in an intensely hot flame 92 as it passes between the forming rolls. The pressure of the burning gases may be sufficient to prevent actual contact of the glass with the rolls, while at the same time permitting the forming action of the rolls on the glass. The effect of the flame is to eliminate or prevent any shear mark or chilling effect of the cutter, to prevent undue cooling of the glass, or where desired, to raise the temperature of the glass and to leave it in suitable condition to readily conform to the shape of the molds.

Means for circulating a cooling liquid comprises an intake pipe 94 opening into the bottom of the drum 88. The stem 87 is formed with longitudinal flanges 95 by which the hollow space within the drum 88 is separated into lower and upper compartments. The water flows forward through the lower compartment and after passing beyond the partition walls 95, moves upward and is returned through the upper compartment to the outlet pipe 96.

Modifications may be resorted to within the spirit and scope of my invention.

What I claim is:

1. The combination of means for supplying a descending column of molten glass, and means moving downward with the glass for engaging and shaping the side walls of the descending column to form mold charges or gobs.

2. The combination of means for supplying a descending column of molten glass, means moving downward with the glass for engaging and shaping the side walls of the descending column to form mold charges or gobs, and severing means to separate the formed charges from the oncoming glass.

3. The combination of means for causing a downward movement or flow of molten glass from a pool, and gob forming means engaging and shaping the lateral surfaces of the glass and moving downward therewith while the glass is connected with and flowing from the pool 4. The combination of a container for molten glass having a round discharge orifice at which a continuous supply of the glass is maintained and through which a cylindrical column of glass is extruded, a forming device having a concave forming surface rolling in contact with the extruding glass and moving therewith while the latter is still united with the glass in the container.

5. The combination of a container for molten glass having a round discharge orifice at which a continuous supply of the glass is maintained and through which a cylindrical column of glass is extruded, a forming device having a concave forming surface rolling in contact with the extruding glass and moving therewith while the latter is still united with the glass in the container, and severing means cooperating with said forming device for separating the glass into individual formed masses or gobs.

6. The combination of means for causing a flow of molten glass in the form of a stream or column, and forming means rotating continuously in contact therewith and shaping the glass into mold charges or gobs.

7. The combination of means for causing a flow of molten glass in the form of a stream or column, forming means rotating continuously in contact therewith and shaping the glass into mold charges or gobs, and severing means carried with said forming means and operable to sever the charges.

8. The combination of means for causing molten glass to move downward in a stream or column, and a forming roll rotating in contact with the glass and having recesses extending lengthwise in its periphery shaped to impart a gob formation to the glass.

9. The combination with means to flow a stream or column of molten glass, of a forming element rolling in contact with the glass, said element having a recess or groove in its periphery to shape the glass, said groove extending circumferentially along a portion only of said periphery.

10. The combination with means for flowing a column or stream of molten glass, of a forming roll having gob forming recesses extending lengthwise in its periphery, and means for rotating said roll in contact with the glass.

11. The combination with means for flowing a column or stream of molten glass, of a forming roll having gob forming recesses extending lengthwise in its periphery, means for rotating said roll in contact with the glass, and severing means carried by said roll for severing the gobs.

12. The combination of a container for molten glass having an outlet at which a continuous supply of the glass is maintained and through which a column of glass is extruded, a pair of gob shaping rolls on opposite sides of the glass, means to rotate said rolls in contact with the extruded glass while the latter is still united with the glass in the container, and cutting mechanism arranged to advance with the shaping surfaces of the rolls and sever the glass into individual masses.

13. The combination of a container for molten glass having an outlet through which the glass is extruded, a pair of rolls on opposite sides of the glass, means to rotate said rolls in contact with the glass, means to sever the glass into individual masses, said severing means being carried with the rolls and comprising cutter blades, and means to periodically project the cutter blades and thereby sever the glass.

14. The combination of a gob forming device rotatable about a horizontal axis and having a descending gob forming surface, a cutter carried thereby, and automatic means to actuate the cutter at a predetermined point in the rotation of said device.

15. The combination of means to produce a flow of molten glass, a forming device having a surface to engage and shape the glass, means to rotate said device with said surface in contact with and advancing in the direction of movement of the flowing glass, and a cutter rotating with said device and operable at a predetermined point in the rotation of said device to sever the glass.

16. The combination of means to produce a flow of molten glass, a forming device, means to rotate said device in contact with the flowing glass, a cutter carried by said device, and automatic means to actuate said cutter and thereby sever the glass.

17. The combination of a gob forming roll, means to rotate it, cutters carried with said roll, and automatic means to project said cutters alternately at diametrically opposite points on the periphery of said roll.

18. The combination of a roll, means to rotate it, cutting mechanism mounted to rotate with the roll and comprising diametrically opposite blades, a connector between said blades, and automatic means to shift said connector first in one direction and then in the opposite direction and thereby project said blades alternately.

19. The combination of a roll, means to rotate it, cutting mechanism mounted to rotate with the roll and comprising diametrically opposite blades, a connector between said blades, and a stationary cam operable to shift said connector alternately in opposite directions and thereby project said blades alternately, said cam arranged to project said blades at the same rotative position during the rotation of said roll.

20. The combination of a gob forming roll having two oppositely disposed gob forming recesses extending along its periphery, said roll having diametrically opposite slots between the ends of said recesses, cutter blades mounted to reciprocate radially in said slots, a yoke connecting said blades, means to rotate the roll, and a stationary cam arranged to shift said yoke in one direction when the roll reaches a predetermined point in its rotation to thereby project one cutter and to shift the yoke in a reverse direction when the roll has rotated a half revolution beyond said position, whereby each cutter is projected at the same rotative position.

21. The combination of means for flowing a stream or column of molten glass, a forming member rotating in contact with the flowing glass, a cutter rotating with said member and movable radially from a position within said member to a projected position, and automatic means to project said cutter when opposite the glass.

22. The combination of a receptacle for molten glass having an outlet through which the glass issues, a pair of forming rolls on opposite sides of the issuing glass, means to rotate said roll, cutters carried by the rolls, and means to simultaneously project the cutters radially across the path of the glass.

23. The combination of a pair of rolls rotatable about horizontal axes and arranged with their peripheries in contact, said peripheries being recessed to form molding cavities, cutters mounted within the rolls for radial movement, and automatic means to project the cutters to an overlapping position.

24. The combination of means for flowing a stream or column of glass, a hollow forming roll having a glass shaping concave surface with its axis of curvature extending circumferentially of the roll, said surface running in contact with the flowing glass, and means for circulating a cooling fluid through the roll.

25. The combination of a pair of gob forming rolls mounted to rotate on parallel axes in opposite directions with their peripheries in contact, said peripheries being formed with gob forming recesses each substantially semi-circular in cross-section and tapered in the direction of their length, said recesses arranged to be brought opposite each other as the rolls rotate and thereby form a circular passageway between the contacting rolls.

26. The method which consists in supplying a descending cylindrical column of molten glass and shaping the glass during its descent by a solid shaping means surrounding engaging and moving downward with the descending column.

27. The method which consists in causing a cylindrical column of molten glass to issue from an outlet in the bottom of a receptacle, shaping the issuing glass and periodically varying the diameter of the column by shaping means engaging the surface of the glass and advancing therewith during the shaping operation, and severing the shaped portion of glass from the oncoming stream.

Signed at Toledo, in the county of Lucas and State of Ohio, this 18th day of May, 1920.

LEONARD D. SOUBIER.